UNITED STATES PATENT OFFICE.

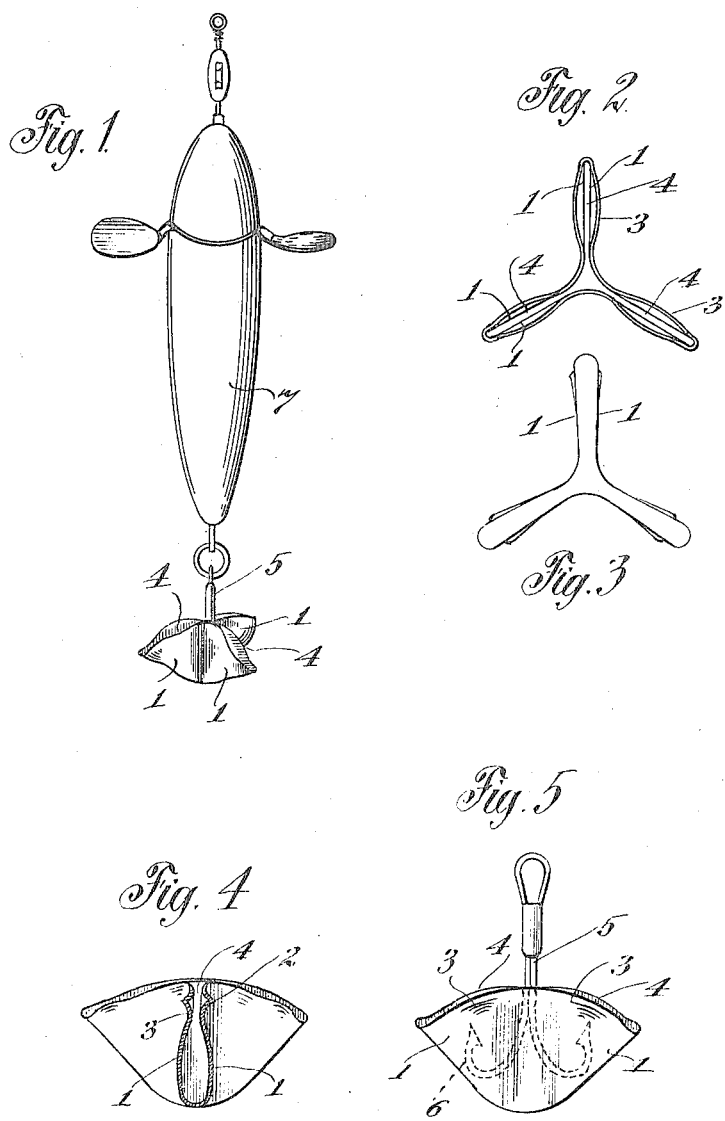

BURT C. DALLER, OF DETROIT, MICHIGAN.

FISH-HOOK GUARD.

1,255,516.  Specification of Letters Patent.  Patented Feb. 5, 1918.

Application filed February 16, 1917. Serial No. 148,960.

*To all whom it may concern:*

Be it known that I, BURT C. DALLER, a citizen of the United States of America, residing at Detroit, in the county of Wayne and State of Michigan, have invented certain new and useful Improvements in Fish-Hook Guards, of which the following is a specification, reference being had therein to the accompanying drawings.

This invention relates to a fish hook guard and the primary object of my invention is to provide a guard that may be easily placed on a fish hook and frictionally held thereon to permit of the hook being safely handled or carried.

Another object of my invention is to provide a guard that has been especially designed for a gang fish hook, the guard being a unitary structure having pockets shaped and disposed to receive the hooks of a gang lure, spinner or artificial bait.

I attain the above objects by a simple, durable and inexpensive guard to protect the barbs of hooks, permit of the hooks being loosely carried in a creel or tackle box, and prevent the hook from being caught in clothing or the hand until the same is baited.

My invention will be hereinafter specifically described and then claimed, and reference will now be had to the drawing, wherein—

Figure 1 is a perspective view of a spinner having a gang hook provided with a guard;

Fig. 2 is a top plan of the guard;

Fig. 3 is a bottom plan of a guard;

Fig. 4 is a cross sectional view of the guard; and

Fig. 5 is a side elevation of the same relative to a gang hook.

The hook guard comprises a pocket having side walls 1 and the pockets may be conveniently formed by bending a piece of metal so that the side walls will be in opposed relation and slightly convexed, as best shown in Fig. 4. Those edges of the side walls 2 forming the mouth or opening of the pocket are flared or flanged outwardly, as at 2, to afford easy entrance for a hook into the pocket, and contiguous to the flared or flanged edges of the walls 1 are inbent portions 3 which provide a restricted passage 4 into the pocket. By contracting the mouth portion of the pocket, there is a distinct advantage gained, as the contracted portion will prevent a guard from becoming accidentally displaced relative to the hook. When entering a hook in the guard, the contracted portions of the walls 1 are sprung apart to allow the hook shaped portion of the hook to enter the pocket and immediately upon entering and assuming a position between the convex walls 1 the mouth or opening of the pocket is again restricted and the guard cannot be removed without some effort which is necessary to pull the guard off the hook.

The guard may be conveniently made triangular shaped in elevation, so that the shank of the hook may occupy a position outside of a restricted or contracted portion of the pocket mouth for instance along one of the hypotenuse walls of the triangular shaped pocket. This is best understood when considering a plurality of pockets that will accommodate a gang hook having a shank 5 and a plurality of hooks 6. The gang hook, as illustrated, has hooks disposed 120 degrees apart and in forming the guards for this type of hook, the pockets are made of a single piece of material. The pockets will communicate at a central point and it is the juncture of said pockets that provides clearance for the shank 5 of the hook. The hooks 6 may be simultaneously sprung into the pockets of the guards and as the barbed portions of the hook are inclosed by the pockets, the gang hook can be safely carried by a spinner 7 and readily handled without any danger of a gang hook attached thereto injuring the hand.

From the foregoing, it will be observed that a guard may be made for a single hook or a guard having integral pockets for a double hook or a gang hook, and that in either instance, the hook is well protected and the guard firmly held until such time as it is desired to remove the same. The guard may be made of a light, durable and non-corrodible metal and of sizes to correspond to the standard sizes of fish hooks.

What I claim is:—

1. As a new article of manufacture, a guard for a plurality of hooks providing integral individual pockets adapted to inclose the barbed portions of the hooks.

2. A guard for a gang hook comprising individual pockets for the barbed portions of the hooks and a central portion for the shank of the hook.

3. A guard of the type described having a plurality of angularly disposed communicating pockets with the opposed walls of each pocket inbent to provide restricted passages into the pockets.

4. A guard of the type described made of a single piece of material bent to provide individual communicating pockets having the walls thereof inbent to provide restricted passages into the pockets.

In testimony whereof I affix my signature in presence of two witnesses.

BURT C. DALLER.

Witnesses:
ANNA M. DORR,
CHAS. W. STAUFFIGER.